(12) United States Patent
Pantpratinidhi et al.

(10) Patent No.: US 11,657,568 B2
(45) Date of Patent: May 23, 2023

(54) METHODS AND SYSTEMS FOR AUGMENTED REALITY TRACKING BASED ON VOLUMETRIC FEATURE DESCRIPTOR DATA

(71) Applicant: Verizon Patent and Licensing Inc., Basking Ridge, NJ (US)

(72) Inventors: Nikhil Sadashiv Pantpratinidhi, El Dorado Hills, CA (US); Adwait Ashish Murudkar, Somerville, NJ (US); Gang Lin, Stilwell, KS (US); Vinaya Kumar Polavarapu, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 17/245,920

(22) Filed: Apr. 30, 2021

(65) Prior Publication Data
US 2022/0351465 A1    Nov. 3, 2022

(51) Int. Cl.
| | |
|---|---|
| *G06T 17/10* | (2006.01) |
| *G06T 7/73* | (2017.01) |
| *G06T 19/00* | (2011.01) |
| *G06V 10/44* | (2022.01) |

(52) U.S. Cl.
CPC .......... *G06T 17/10* (2013.01); *G06T 7/73* (2017.01); *G06T 19/006* (2013.01); *G06V 10/443* (2022.01)

(58) Field of Classification Search
None
See application file for complete search history.

(56) References Cited

U.S. PATENT DOCUMENTS

| | | | |
|---|---|---|---|
| 2016/0267661 A1* | 9/2016 | Moteki | ............... G06T 7/593 |
| 2017/0316612 A1* | 11/2017 | Moteki | ............... G06T 15/20 |
| 2020/0175764 A1* | 6/2020 | Romea | ................. G06T 7/73 |
| 2021/0407123 A1* | 12/2021 | Tang | ................... G06T 7/80 |

(Continued)

OTHER PUBLICATIONS

Wagner, Daniel, et al. "Real-time detection and tracking for augmented reality on mobile phones." IEEE transactions on visualization and computer graphics 16.3 (2009): 355-368. (Year: 2009).*

(Continued)

*Primary Examiner* — Ryan M Gray

(57) ABSTRACT

An illustrative augmented reality tracking system obtains a volumetric feature descriptor dataset that includes: 1) a plurality of feature descriptors associated with a plurality of views of a volumetric target, and 2) a plurality of 3D structure datapoints that correspond to the plurality of feature descriptors. The system also obtains an image frame captured by a user equipment (UE) device. The system identifies a set of image features depicted in the image frame and detects, based on a match between the set of image features depicted in the image frame and a set of feature descriptors of the plurality of feature descriptors, that the volumetric target is depicted in the image frame. In response to this detecting and based on 3D structure datapoints corresponding to matched feature descriptors, the system determines a spatial relationship between the UE device and the volumetric target. Corresponding methods and systems are also disclosed.

20 Claims, 9 Drawing Sheets

(56) References Cited

U.S. PATENT DOCUMENTS

2022/0197378 A1\* 6/2022 Song .................. G06F 3/013
2022/0245394 A1\* 8/2022 Virodov ............... G06K 9/623

OTHER PUBLICATIONS

Pusztai, Zoltan, and Levente Hajder. "A turntable-based approach for ground truth tracking data generation." (2016): 500-511. (Year: 2016).\*

Moreels, Pierre, and Pietro Perona. "Evaluation of features detectors and descriptors based on 3d objects." International journal of computer vision 73.3 (2007): 263-284. (Year: 2007).\*

\* cited by examiner

METHODS AND SYSTEMS FOR AUGMENTED REALITY TRACKING BASED ON VOLUMETRIC FEATURE DESCRIPTOR DATA

BACKGROUND INFORMATION

Various types of extended reality technologies are being developed, deployed, and used by users to engage in various types of extended reality experiences. As one example, virtual reality technologies provide virtual reality experiences whereby users become fully immersed in a virtual reality world in which they can move about within virtual spaces and see, hear, and/or interact with virtual objects and/or virtual avatars of other users in ways analogous to real-world experiences. As another example, augmented reality technologies (also referred to as mixed reality technologies) provide augmented reality experiences whereby users continue to experience the real world around them to at least some extent (e.g., seeing real objects in their environment by way of a partially transparent heads-up display, video passed through from a head-mounted camera, etc.) while also being presented with virtual elements and augmentations that do not exist in the real world. For instance, virtual objects or characters may be presented as part of an augmented reality game or other entertainment application, virtual instructions or other information may be presented as part of an augmented reality educational application (e.g., an application designed to support a student in a science lab, etc.), virtual schematics or datasheets may be presented as part of an augmented reality occupational support application (e.g., to support a welder on a manufacturing floor, a car mechanic in a repair shop, etc.), or the like.

In certain augmented reality applications, it is desirable for virtual elements to be presented in a manner that accurately and efficiently accounts for real-world elements of the scene or environment within which the augmented reality experience is presented. However, various challenges must be overcome to identify, track, and account for real-world elements to this end.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

DETAILED DESCRIPTION OF EXAMPLE EMBODIMENTS

Figure 1:
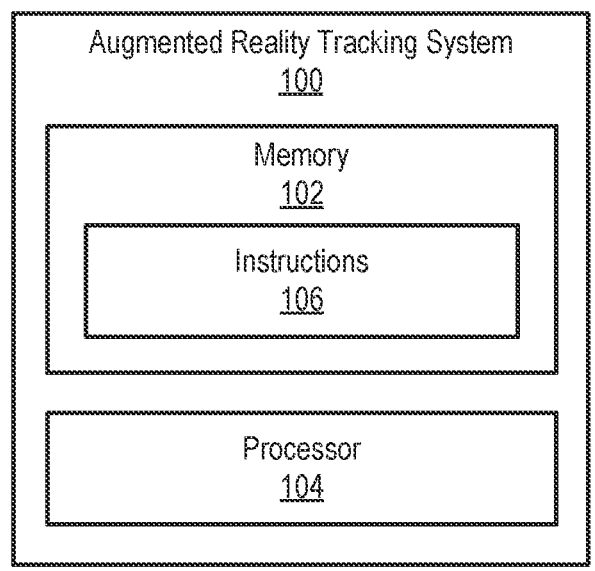
FIG. 1 shows an illustrative augmented reality tracking system configured to perform augmented reality tracking based on volumetric feature descriptor data according to embodiments described herein.

Methods and systems for augmented reality tracking based on volumetric feature descriptor data are described herein. As mentioned above, it may be desirable in certain augmented reality applications for augmentations (e.g., virtual elements presented alongside real-world elements during an augmented reality experience) to be presented in a manner that accurately and efficiently accounts for conditions of the real-world scene. As one example, an augmented reality entertainment application may involve a real-world object (e.g., a tabletop village, a model train set, a model of a castle or fantasy landscape, etc.) that may be available for purchase in connection with the entertainment application and that is to be augmented with virtual elements (e.g., villager characters, train steam, flying dragons and other fantasy characters, etc.) during an augmented reality experience. As another example, an augmented reality education application may involve a virtual instructor (e.g., a well-known scientist or other public figure, etc.) that may provide instruction to a student working in a science lab.

In these or various other types of examples, methods and systems described herein may be employed to facilitate augmented reality tracking based on volumetric feature descriptor data in any of the ways described herein. By doing this in the ways described herein, augmented reality tracking systems may present augmentations of various types in a manner that accounts for real-world objects and scenes immersively, accurately, and effectively. For instance, in reference to certain examples mentioned above, augmented reality tracking systems and methods described herein may facilitate making villager characters appear to walk on the streets of the tabletop village, making virtual train steam appear to rise from the model train as it winds around the track, making virtual dragons appear to fly around model castles and breathe fire onto the landscape below, making celebrity instructors appear to stand on the floor of the lab partially occluded by lab workbenches (e.g., rather than floating in the air in front of the scene) and so forth.

For these and other such applications, methods and systems described herein perform augmented reality tracking based on volumetric feature descriptor data. As will be described in more detail below, volumetric feature descriptor data may refer to data included in specially-configured datasets referred to herein as volumetric feature descriptor datasets. Volumetric feature descriptor datasets may include at least two types of data that methods and systems described herein use for augmented reality tracking. First, volumetric feature descriptor datasets may include feature descriptors (also referred to as two-dimensional (2D) feature descriptors) associated with various features of a volumetric target (e.g., a three-dimensional (3D) object or 3D scene such as described in the examples above) and associated with various views of the volumetric target (e.g., views of the 3D object from various angles around the object, views from various vantage points within the 3D scene, etc.). Second, volumetric feature descriptor datasets may include 3D structure datapoints (e.g., spatial coordinates of 3D points of a point cloud associated with a 3D structure). For example, a volumetric feature descriptor dataset may include a corresponding 3D structure datapoint for each feature descriptor that is included in the volumetric feature descriptor dataset.

As used herein, an "image feature" may refer to information about the content of an image at a specific part of the image. Various computer vision applications identify (e.g., find, detect, etc.) and analyze image features as part of image processing operations in a computer vision pipeline. Examples of image features include edges, corners, ridges, regions of interest points ("blobs"), and so forth. In other examples, image features may be related not necessarily to image location or geometry but, rather, to image attributes such as color, texture, or the like. Image features may be identified using various established or novel feature detection algorithms, including classical or conventional feature detection algorithms, neural-network-based feature detection algorithms, and/or any other feature detection algorithms as may serve a particular implementation. Image features detected within an image are associated with 2D information, since the image from which the image features are derived is a 2D representation of the 3D world. Image features that are in specific locations (e.g., corners, edges, etc.) are referred to as key points and may be described by their neighborhood patches of pixels in a manner that is invariant to changes in illumination, rotation, scale, and/or other such variables that may change from image to image, even if the images depict the same content. The description of a neighborhood patch of pixels for a particular 2D image is referred to as a "feature descriptor" or "key point descriptor."

Hence, the feature descriptors included in the volumetric feature descriptor datasets described herein (e.g., Binary Robust Invariant Scalable Key points (BRISK) feature descriptors or other suitable feature descriptors) may each describe a volumetric target (e.g., a 3D object or scene, etc.) as the target is represented in 2D from a particular view. However, as will be described in more detail below, because information from images captured from a variety of views of a volumetric target may be analyzed and consolidated within a volumetric feature descriptor dataset, the volumetric feature descriptor dataset may provide sufficient data for the volumetric target to be identified from any arbitrary angle as the target may be viewed by a user in the real world. As such, and because each feature descriptor may be associated with a 3D structure datapoint within the volumetric feature descriptor dataset, a volumetric feature descriptor dataset for a particular volumetric target may provide sufficient information for an augmented reality tracking system to quickly (e.g., in real time) detect whether the particular volumetric target is depicted in a particular image frame and, if it is, to determine a spatial relationship between the device capturing the image and the volumetric target (e.g., the relative location and orientation ("pose") of the capture device and the volumetric target).

Based on this detection and the determination of the spatial relationship, tracking data may be derived and provided to indicate precisely where the volumetric target is located within a given image and with respect to a 3D world coordinate system. In this way, augmentations may be presented in connection with an augmented reality presentation in responsive, efficient, accurate, and immersive ways, such as described above.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Methods and systems described herein for augmented reality tracking based on volumetric feature descriptor data may provide any of the benefits mentioned above, as well as various additional and/or alternative benefits that will be described and/or made apparent below.

FIG. 1 shows an illustrative augmented reality tracking system 100 ("system 100") configured to perform augmented reality tracking based on volumetric feature descriptor data in accordance with principles described herein. System 100 may be implemented by computer resources such as processors, memory facilities, storage facilities, communication interfaces, and so forth. In some examples, system 100 may be partially or fully implemented by user equipment (UE) devices such as augmented reality presentation devices (e.g., head-mounted devices, etc.), mobile devices (e.g., smartphones, tablet devices, etc.), personal computers, or other equipment used directly by end users. Additionally or alternatively, system 100 may be partially or fully implemented by computing systems that are located remotely from users and/or accessed by a plurality of UE devices, such as distributed computing systems operated by a cellular data provider (e.g., multi-access edge compute (MEC) systems), distributed computing systems operated by a cloud-computing provider (e.g., multi-access cloud compute systems), or other suitable computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with augmented reality tracking based on volumetric feature descriptor data as described herein and/or as may serve a particular implementation.

Figure 2:
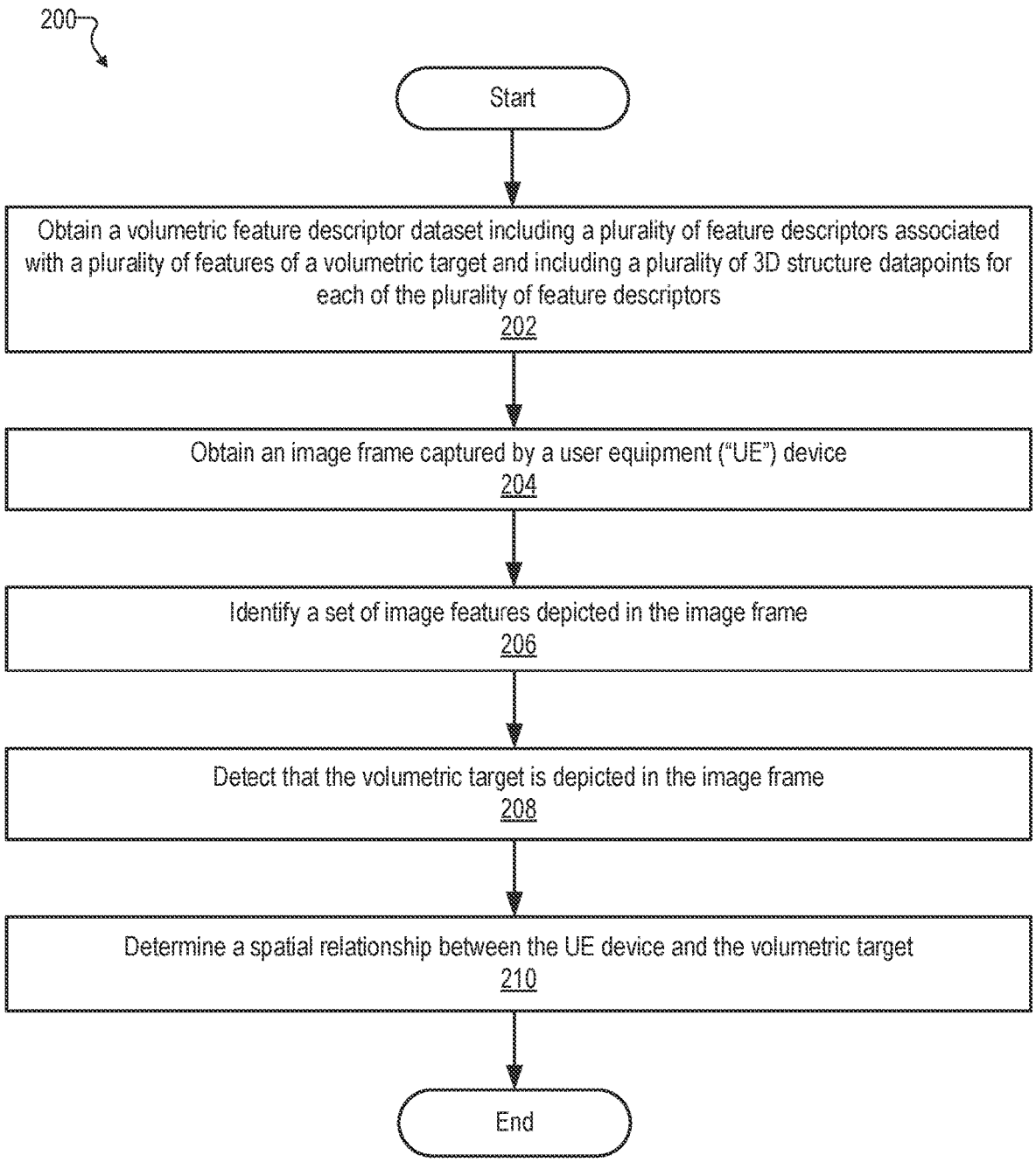
FIG. 2 shows an illustrative method for augmented reality tracking based on volumetric feature descriptor data according to embodiments described herein.

As one example of functionality that processor 104 may perform, FIG. 2 shows an illustrative method 200 for augmented reality tracking based on volumetric feature descriptor data in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an augmented reality tracking system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-210 of method 200 will now be described in more detail as the operations may be performed by system 100 (e.g., by processor 104 as processor 104 executes instructions 106 stored in memory 102).

At operation 202, system 100 may obtain a volumetric feature descriptor dataset. For example, as will be described in more detail below, the volumetric feature descriptor dataset may be based on a plurality of master images depicting a plurality of views of a volumetric target (e.g., an individual 3D object or a full 3D scene such as a room). As mentioned above, the volumetric feature descriptor dataset may include volumetric feature descriptor data such as feature descriptors and corresponding 3D structure datapoints that describe the volumetric target in a manner that allows the volumetric target to be identified from various vantage points (e.g., various perspectives around the 3D object or within the 3D scene, etc.). More specifically, the volumetric feature descriptor dataset may include a plurality of feature descriptors that are associated with a plurality of image features (e.g., corners, edges, etc.) of the volumetric target and that are associated with a plurality of views of the volumetric target (e.g., from the various vantage points mentioned above). Additionally, the volumetric feature descriptor dataset may include a plurality of 3D structure datapoints corresponding to the plurality of feature descriptors. For instance, the volumetric feature descriptor dataset may include one corresponding 3D structure datapoint for each feature descriptor represented within the volumetric feature descriptor dataset.

One example of a volumetric feature descriptor dataset for a particular volumetric target having 10,000 identified image features may thus include 10,000 feature descriptors (one for each image feature) and 10,000 3D structure datapoints (one corresponding to each feature descriptor). These image features may be associated with points on various parts of the volumetric target, not all of which would be visible from a single view of the volumetric target (i.e., not all of which would be depicted in any one image of the volumetric target). For example, if the volumetric target is a 3D object, certain image features represented within the volumetric feature descriptor dataset may be features on a front side of the object that is visible from a front view, while other image features may be features on a back side (or other suitable part) of the object that would not be visible from the front view but are visible from a back view (or other suitable view) of the object. As another example, if the volumetric target is a 3D scene such as a room, certain image features represented within the volumetric feature descriptor dataset may be features of a north wall of the room visible to a person or capture device facing north, while other image features may be features of a south wall (or other suitable part) of the room that would not be visible from the north-facing view but would be visible from a south-facing view (or other suitable view) within the room.

As will be described in more detail below, the volumetric feature descriptor dataset may be generated by any suitable volumetric feature descriptor generation system at any time. For instance, if the volumetric target is a particular 3D object such as a model castle object for an augmented reality entertainment application (as will be described and illustrated in more detail below), the volumetric feature descriptor generation system may be a computing system that is operated by a producer (e.g., a designer, manufacturer, distributor, etc.) of the model castles prior to sales of the model castles. In this example, the volumetric feature descriptor dataset for the model castle may thus be provided (e.g., on a computer readable medium, offered for download with a link, etc.) together with each model castle object that is sold. To generate the volumetric feature descriptor dataset in this example, the 3D model castle object may be carefully and deliberately analyzed such as by being rotated on a turntable in view of a stationary camera that captures images (e.g., the plurality of master images on which the volumetric feature descriptor dataset will be based) from various angles all around the 3D object as the turntable rotates.

In other examples, such as when the volumetric target is a 3D room or a 3D object that has not be pre-analyzed in the manner described above for the model castle object, the volumetric feature descriptor generation system may be integrated with system 100 itself and the volumetric feature descriptor dataset may be generated as system 100 is set to a volumetric feature descriptor generation mode (also referred to herein as an "offline" mode) and a user manually moves the UE device about the room to capture and accumulate the plurality of master images (e.g., comprising visual and depth data) for various surfaces within the room (e.g., wall surfaces, object surfaces, etc.). As this occurs, system 100 may generate and refine the volumetric feature descriptor dataset in real time.

At operation 204, system 100 may obtain an image frame captured by a UE device. At this point in method 200, system 100 may be set to operate in an augmented reality presentation mode (also referred to herein as an "live" mode) in which image frames captured by the UE device are analyzed and appropriately augmented to add virtual elements (e.g., augmentations such as characters walking around the model castle or flying around the room while avoiding collisions with real objects within the room, being occluded by real objects within the room, etc.). The image frame captured by the UE device will be understood to represent a single image frame in a sequence of image frames that may be captured by the UE device (e.g., by a video camera integrated with a smartphone or other augmented reality presentation device).

At operation 206, system 100 may identify a set of image features depicted in the image frame (as well as in each image frame of the sequence of image frames as the frames are captured and obtained for analysis). For example, a feature detection algorithm configured to identify key points such as corners, edges, ridges, blobs, and the like, may be applied to the image frame obtained at operation 204 to identify, in certain examples, hundreds or thousands of image features of the image frame.

At operation 208, system 100 may detect that the volumetric target is depicted in the image frame. For example, if the volumetric target is a 3D object such as the model castle object of the example above, system 100 may determine that the model castle is detected to be at least partially depicted in the image frame. As part of this detection, system 100 may differentiate one object from another based on certain features (e.g., one particular model castle rather than a different model that the same company provides) and, in response to detecting such details of which volumetric target is depicted, may obtain additional volumetric feature descriptor data specific to the detected object. For example, in certain implementations, operation 202 may be performed in response to detecting that a certain volumetric target is depicted at operation 208. As another example, a more basic volumetric feature descriptor dataset (e.g., representative of fewer image features) may be obtained at operation 202 and a more detailed volumetric feature descriptor dataset (e.g., representative of a greater number of image features) may be accessed in response to the detection at operation 208.

The detection of the volumetric target may be performed based on volumetric feature descriptor data in any suitable manner. For instance, the detection may be based on a match between the set of image features identified at operation 208 to be depicted in the image frame and a set of feature descriptors included in the plurality of feature descriptors represented in the volumetric feature descriptor dataset obtained at operation 202 (or obtained in response to the detecting at operation 208). The matching between image frame features and feature descriptors from the volumetric feature descriptor dataset may be performed in various ways. As one example, the augmented reality tracking system may determine whether the volumetric target is depicted in the frame based on a number of detected image features from the image frame that are determined to match feature descriptors. As another example, the augmented reality tracking system may determine whether the volumetric target is depicted in the frame based on an analysis of the confidence levels and/or probabilities associated with each feature that is determined to match with a feature descriptor (e.g., a degree to which the feature matches, a distance in feature space between the detected feature and the feature descriptor, etc.). Based on these or other types of determinations, the augmented reality tracking system may generate a probability or confidence level that the volumetric target has been detected in certain implementations. Additionally or alternatively, the augmented reality tracking system may be configured to indicate whether a particular confidence or probability threshold is satisfied, such that the system may positively indicate that the volumetric target is detected (e.g., if the threshold is satisfied) or is not detected (e.g., if the threshold is not satisfied).

Because the volumetric feature descriptor dataset may include 2D feature descriptors of the 3D object as viewed from various vantage points around the 3D object, this matching may be expected to succeed irrespective of the angle or perspective that the UE device may have with respect to the 3D object when capturing the image frame. However, the vantage point at which the image frame is captured will have a significant influence on which of the feature descriptors within the volumetric feature descriptor dataset are determined to match the identified features of the image frame. For example, if the image frame depicts the 3D object from a front side of the object, different feature descriptors from the volumetric feature descriptor dataset will be detected to have a match than if the image frame depicts the 3D object from a back side of the object.

Accordingly, at operation 210, system 100 may determine a spatial relationship between the UE device and the volumetric target (e.g., a spatial relationship specifically corresponding to a moment in time when the image frame was captured). For example, at operation 210, system 100 may perform 3D tracking of the volumetric target with respect to the UE device. This 3D tracking may be performed continuously (e.g., performing the determination of the spatial relationship repeatedly) in response to the detecting that the volumetric target is depicted in the image frame at operation 208. The spatial relationship may represent a pose (e.g., a position and orientation) of the UE device with respect to the volumetric target, a pose of the volumetric target with respect to the UE device, or a respective pose of both the UE device and the volumetric target with respect to a world coordinate system. As will be described in more detail below, system 100 may determine the spatial relationship at operation 210 based on a set of 3D structure datapoints that correspond (within the volumetric feature descriptor dataset) to the set of feature descriptors detected in the match. As mentioned above, the specific feature descriptors that happen to match up with the identified features of the image frame obtained at operation 204 may indicate a vantage point at which the image frame was captured relative to the volumetric target. Thus, by correlating each of these feature descriptors with its corresponding 3D structure datapoint, system 100 may determine the spatial relationship and generate tracking data based on that relationship. For example, the tracking data may be used by the UE device to place augmentations onto the image frame so that the augmentations properly line up with the volumetric target, are properly occluded by aspects of the volumetric target, and so forth.

Figure 3:
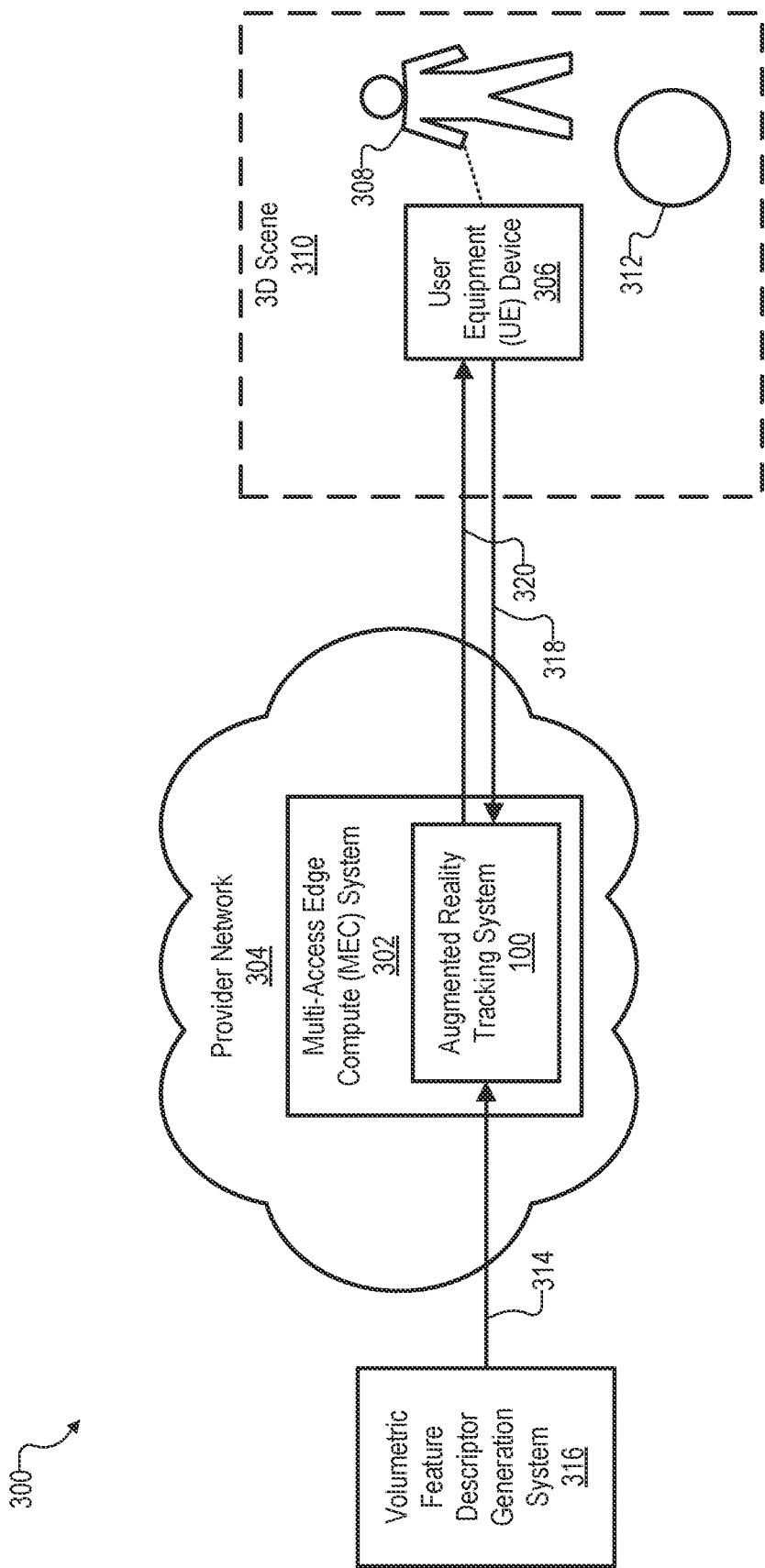
FIG. 3 shows an illustrative configuration in which the augmented reality tracking system of FIG. 1 may operate according to embodiments described herein.

FIG. 3 shows an illustrative configuration 300 in which system 100 may operate in accordance with principles described herein. Specifically, as shown in the example of configuration 300, system 100 may be implemented by a multi-access edge compute (MEC) system 302 operating on a provider network 304 and a user equipment (UE) device 306 may be communicatively coupled to MEC system 302 by way of provider network 304. As further shown in FIG. 3, UE device 306 may be operated by (e.g., used by) a user 308 as UE device 306 and user 308 are located within a 3D scene 310 together with various 3D objects including one illustrative 3D object 312 that implements an illustrative volumetric target (e.g., a model castle object or the like) in various examples described herein.

In accordance with method 200 of FIG. 2, MEC system 302 may obtain a volumetric feature descriptor dataset 314 from a volumetric feature descriptor generation system 316 (operation 202). For example, volumetric feature descriptor dataset 314 will be understood to be associated with the volumetric target that 3D object 312 implements (e.g., the model castle object, etc.). System 100 may also obtain an image frame 318 captured by UE device 306 (operation 204) by way of provider network 304 (e.g., a 5G cellular network or other suitable network on which MEC system 302 operates and to which UE device 306 is connected). System 100 may identify image features depicted in image frame 318 (operation 206), and, based on matches between these image features and feature descriptors of volumetric feature descriptor dataset 314, system 100 may detect that the volumetric target represented by volumetric feature descriptor dataset 314 (e.g., 3D object 312) is depicted in image frame 318 (operation 208). Based on 3D structure datapoints of volumetric feature descriptor dataset 314 that correspond to the feature descriptors that matched with the image features of image frame 318, system 100 may determine a spatial relationship between UE device 306 and 3D object 312 (operation 210). Based on this spatial relationship, system 100 may generate and provide tracking data 320 representative of the spatial relationship to facilitate UE device 306 in presenting an augmented reality experience to user 308 in which 3D object 312 is tracked and accounted for in accordance with the benefits and advantages described herein.

It will be understood that configuration 300 represents only one illustrative configuration in which system 100 may operate. However, as mentioned above, system 100 may, in other configurations, be partially or fully implemented by other computing systems such as UE device 306, a cloud compute system lacking the low latency and real-time responsiveness of a MEC system such as MEC system 302, or another suitable computing system.

Figure 7:
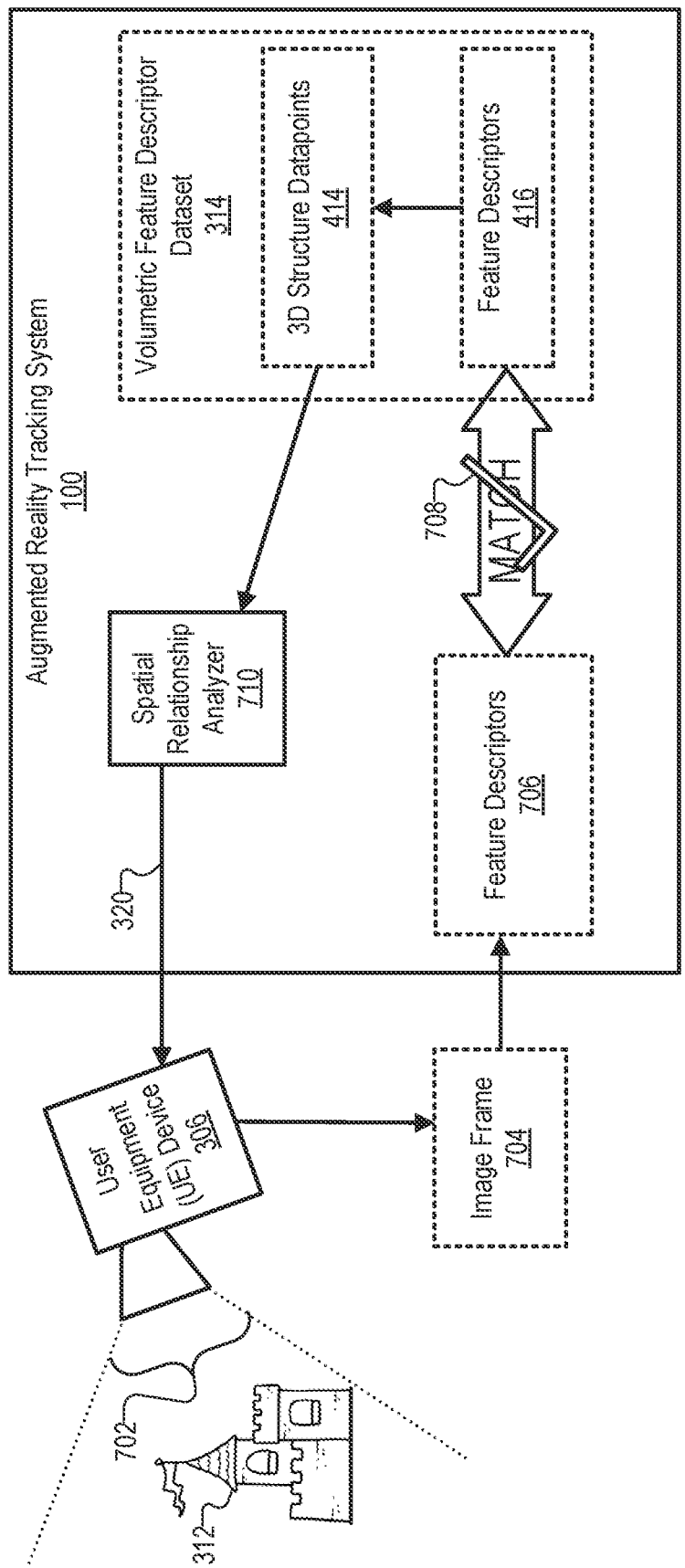
Figure 8:
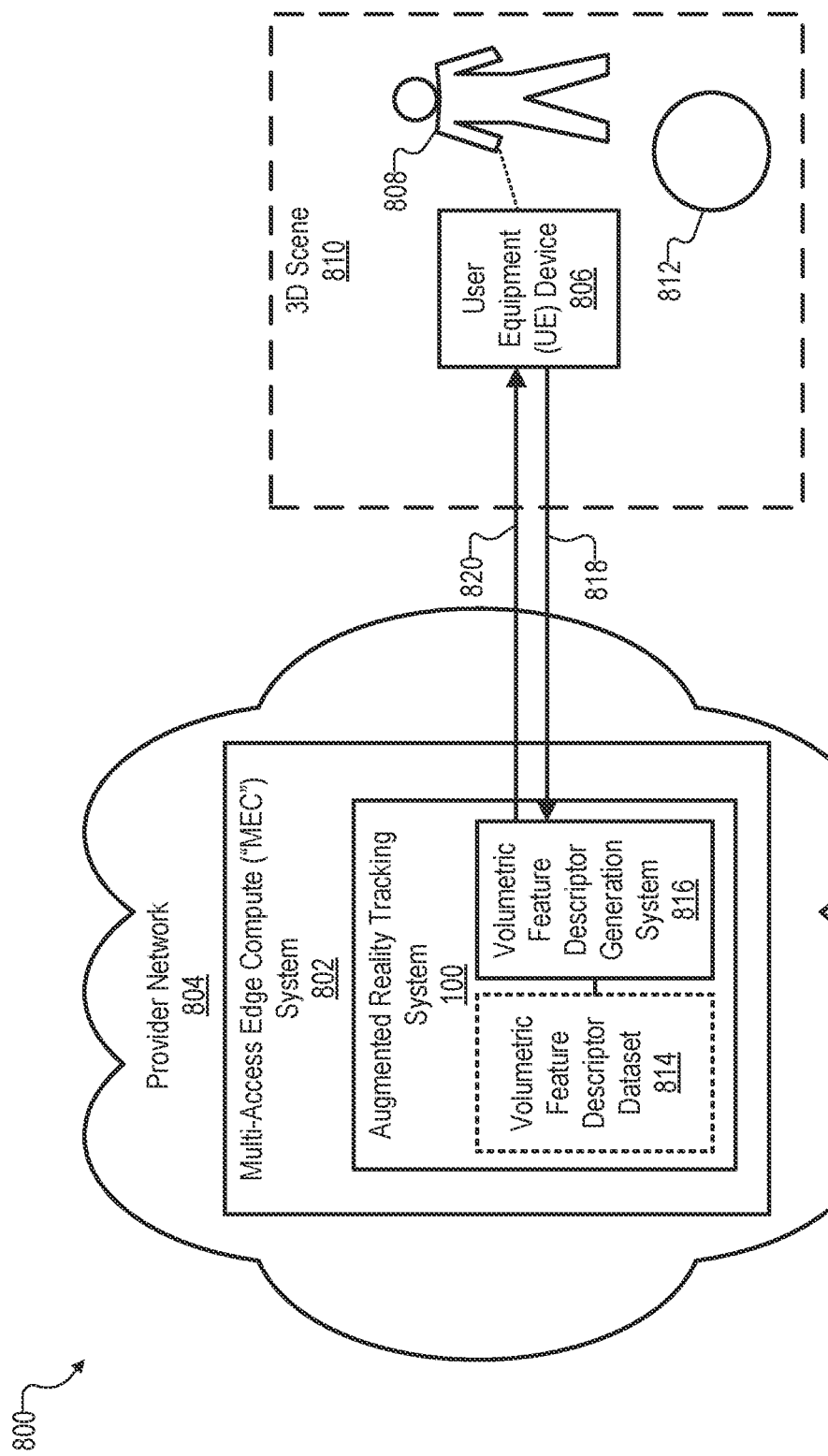
FIG. 8 shows another illustrative configuration in which the augmented reality tracking system of FIG. 1 may operate according to embodiments described herein.

Additionally, as will be illustrated in relation to FIG. 8, it will be understood that in alternative configurations involving different types of volumetric targets (e.g., the entire 3D scene 310 rather than just 3D object 312), a volumetric feature descriptor dataset may be generated in a different manner and/or by a different type of volumetric feature descriptor generation system (e.g., a volumetric feature descriptor generation system implemented by or integrated within system 100, as shown in FIG. 8). Various aspects of operations 202-210 of method 200 and elements of configuration 300 will now be described in relation to FIGS. 4-7.

Figure 4:
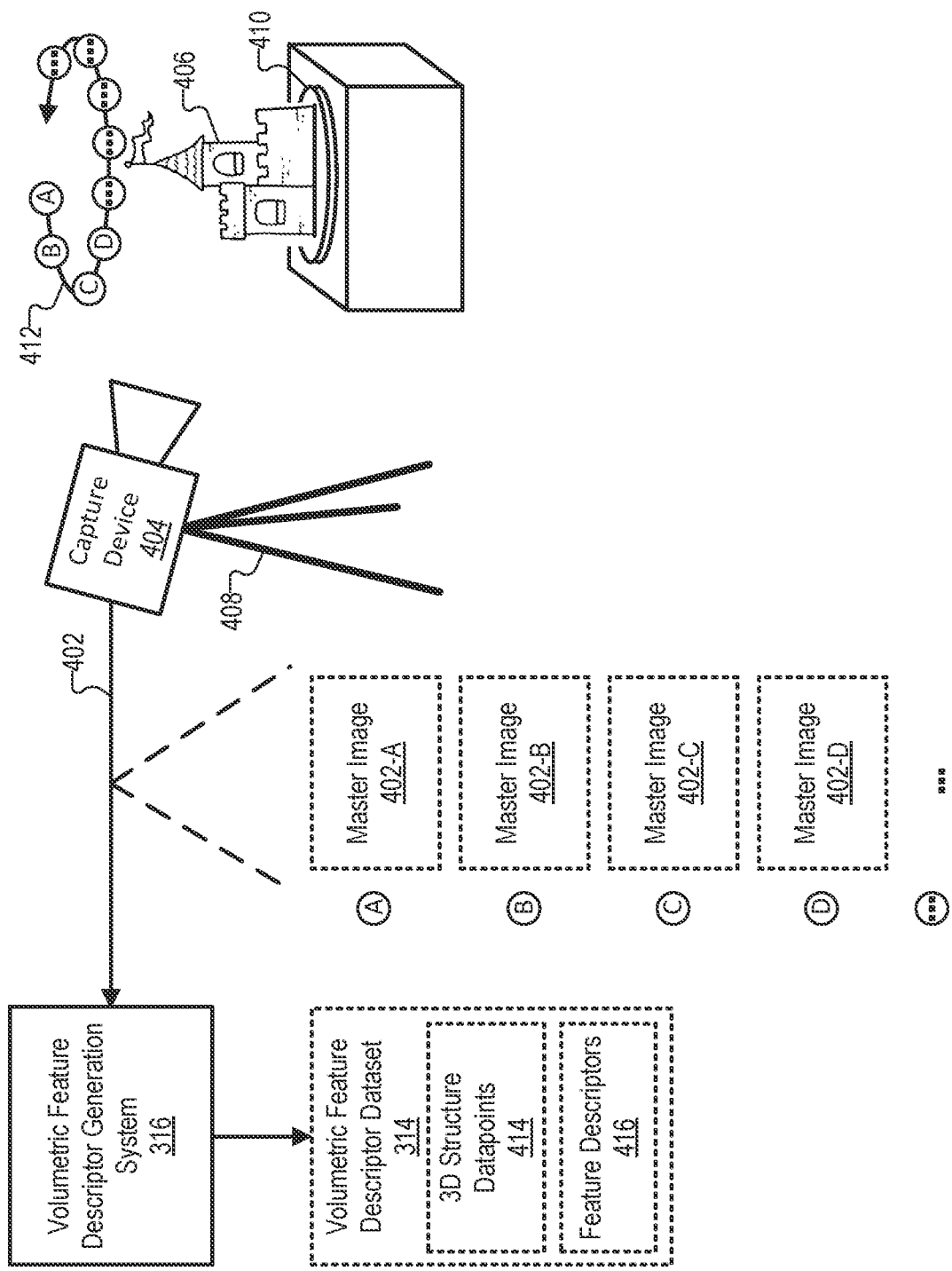
FIGS. 4-5 show illustrative aspects of how a volumetric feature descriptor generation system may generate a volumetric feature descriptor dataset for a volumetric target according to embodiments described herein.
Figure 5:
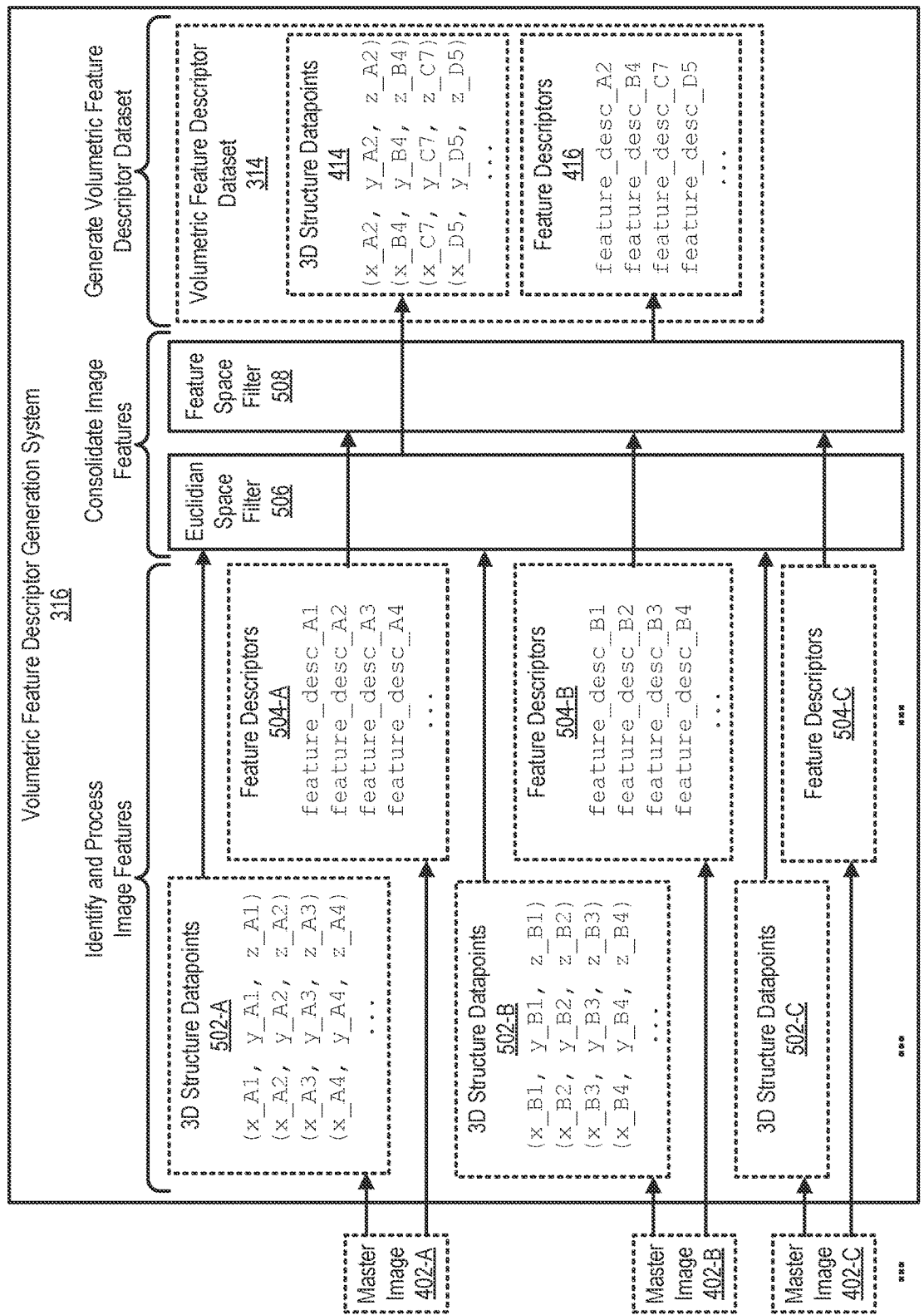

FIGS. 4-5 show certain illustrative aspects of how volumetric feature descriptor generation system 316 may generate volumetric feature descriptor dataset 314 for a volumetric target (e.g., the volumetric target implemented by 3D object 312 in configuration 300) in accordance with principles described herein. As such, FIGS. 4-5 illustrate how volumetric feature descriptor generation system 316 may function (e.g., whether integrated with or separate from system 100) when in the volumetric feature descriptor generation mode (i.e., the offline mode). In these figures and other figures described below, a notation is employed in which dotted-line boxes are used to illustrate data structures (e.g., datasets, images, etc.) while solid-line boxes are used to illustrate physical hardware systems and devices (e.g., computing systems, capture devices such as cameras, physical objects, etc.).

As shown, volumetric feature descriptor generation system 316 may obtain a plurality of master images 402 (e.g., master images 402-A through 402-D and various other master images represented by an ellipsis in FIG. 4). As used herein, "master images" refer to images captured and used as part of the offline mode (e.g., as part of generating the volumetric feature descriptor dataset rather than as part of using the volumetric feature descriptor dataset to identify and track pre-analyzed volumetric targets as is performed in the live mode). As will be described and illustrated below, images captured by a UE device and used for augmented reality tracking in the live mode are referred to herein as "image frames" and are generally distinct from master images, although certain implementations may include overlap between master images and image frames, such as when a volumetric target is analyzed and mapped in real-time during a presentation of an augmented reality experience.

Capture device 404 may be implemented by any suitable image capture device such as a video camera device, a still camera device, a depth capture device, a combination thereof (e.g., a device configured to capture video and depth data), or any other suitable capture device. As shown in this example, a volumetric target 406 that is targeted by the image capture of capture device 404 may be implemented by a 3D object such as, in this example, a model castle object. Volumetric target 406 will also be referred to herein as 3D object 406 or model castle object 406, and will be understood to be similar or identical in form to 3D object 312, though these may be physically different objects (e.g., 3D object 406 being a prototype object used for analysis and 3D object 312 being an actual shipped product, etc.).

Volumetric feature descriptor generation system 316 may be configured to volumetrically model 3D object 406, which may involve information describing how 3D object 406 appears from various views and perspectives around the object. Accordingly, as shown, capture device 404 may capture the plurality of master images 402 from a tripod 408 or other such support structure as different sides of 3D object 406 are presented to the capture device. For example, capture device 404 may serve as a stationary capture device having a view of a turntable 410 on which 3D object 406 rests as turntable 410 rotates 3D object 406 all the way around (i.e., 360°) to present, to stationary capture device 404, a plurality of views of 3D object 406 from vantage points distributed around 3D object 406.

To illustrate, a rotation arrow 412 representing the rotation of turntable 410 is depicted in FIG. 4 above model castle object 406 and turntable 410. As the model castle object is rotated around rotation arrow 412, capture points depicted as small circles labeled "A", "B," "C", and "D" (as well as others labeled with ellipsis to represent any suitable number of additional capture points) represent various points during the rotation of turntable 410 and model castle object 406 at which master images 402 are captured. Individual master images 402 are labeled in FIG. 4 with identical circle objects ("A", "B", "C", "D", and " . . . ") to represent which master image 402-A through 402-D corresponds to which capture point on rotation arrow 412. Accordingly, it will be understood that each master image 402 captured by capture device 404 and obtained by volumetric feature descriptor generation system 316 may depict volumetric target 406 from a different view or vantage point. Though each view may be unique, it will be understood that these views may be relatively close together in certain implementations, such that there may be a significant amount of overlap in content depicted in master images 402.

Based on master images 402 obtained from capture device 404, volumetric feature descriptor generation system 316 may generate volumetric feature descriptor dataset 314 to include both a plurality of 3D structure datapoints 414, as well as a corresponding plurality of feature descriptors 416. Volumetric feature descriptor dataset 314 may be generated in any suitable way. For instance, in one implementation, volumetric feature descriptor generation system 316 may begin by identifying a respective set of image features for each master image 402 obtained from capture device 404 (e.g., a first set of image features for master image 402-A, a second set of image features for master image 402-B, and so forth), and then consolidating these respective sets of image features for each master image 402 into a master set of image features for volumetric target 406. As part of this consolidation, overlap between identical or highly similar features (e.g., image features captured by adjacent master images 402 that essentially provide the same information, etc.) may be filtered and/or otherwise reduced (as will be described in more detail below). Generating volumetric feature descriptor dataset 314 may involve determining (as the plurality of feature descriptors 416) respective feature descriptors for each of the master set of image features for volumetric target 406 and determining (as the plurality of 3D structure datapoints 414) respective 3D structure datapoints for each of the master set of image features for the volumetric target. Volumetric feature descriptor generation system may then store 3D structure datapoints 414 and feature descriptors 416 in a data structure that implements volumetric feature descriptor dataset 314. For instance, the data structure may be implemented as a file (e.g., an XML file, a YML file, a binary data file, etc.), as a data stream (e.g., a data structure configured to be packaged and streamed to a network location such as MEC system 302, etc.), or as another suitable type of data structure.

To further illustrate how volumetric feature descriptor dataset 314 may be generated, FIG. 5 shows a particular example dataflow within volumetric feature descriptor generation system 316. Specifically, as shown, various operations may be performed with respect to each master image 402 that is obtained (e.g., master images 402-A, 402-B, and other master images 402 not fully or explicitly illustrated in FIG. 5 due to space constraints). First, volumetric feature descriptor generation system 316 may identify and process image features to generate respective 3D structure datapoints 502 and feature descriptors 504 for each master image 402 (e.g., 3D structure datapoints 502-A and feature descriptors 504-A for master image 402-A, 3D structure datapoints 502-B and feature descriptors 504-B for master image 402-B, etc.). Next, volumetric feature descriptor generation system 316 may consolidate image features using one or more filters such as a Euclidian space filter 506 and a feature space filter 508. The output of these filtering stages may then be used to generate volumetric feature descriptor dataset 314 with 3D structure datapoints 414 and feature descriptors 416. Each of these processing stages, as well as the elements depicted in FIG. 5 will now be described in more detail.

The different sets of 3D structure datapoints 502 may each represent a respective point cloud including respective coordinates (e.g., Euclidian (x,y,z) coordinates, polar coordinates, etc.) for various points visible from the perspective of each master image 402. For example, as shown, four particular 3D structure datapoints 502-A are shown in FIG. 5, labeled with Euclidian coordinates (i.e., a first point with coordinates (x_A1, y_A1, z_A1), a second point with coordinates (x_A2, y_A2, z_A2), and so forth). An ellipsis is also shown to represent various other 3D structure datapoints 502-A in the set associated with master image 402-A. For example, hundreds or thousands of 3D structure datapoints 502-A may be represented with coordinates in this way. Euclidian coordinates for four particular 3D structure datapoints 502-B are also shown using a similar labeling notation as used for 3D structure datapoints 502-A. 3D structure datapoints 502-C and additional 3D structure datapoints associated with additional master images 402 (e.g., dozens or hundreds of master images 402) will also be understood to be associated with similar sets of 3D structure datapoints 502 as shown for master images 402-A and 402-B.

Volumetric feature descriptor generation system 316 may identify or otherwise determine coordinates of 3D structure datapoints 502 in any manner as may serve a particular implementation. For instance, in certain examples, the determining of the respective 3D structure datapoints may be performed using a structure-from-motion technique as the turntable rotates 3D object 406 around 360° to present the views of 3D object 406 from the vantage points distributed around 3D object 406 (e.g., the vantage points labeled along rotation arrow 412 in FIG. 4 and associated with master images 402).

Similar to the sets of 3D structure datapoints 502, different sets of feature descriptors 504 may each represent respective feature descriptors corresponding to the various image features visible from the perspective of each master image 402. For example, as shown, four feature descriptors 504-A are explicitly shown using a notation indicating which feature descriptor corresponds with which 3D structure datapoint. Specifically, the "feature_desc_A1" feature descriptor 504-A will be understood to correspond to the 3D structure datapoint 502-A having coordinates "(x_A1, y_A1, z_A1)," the "feature_desc_A2" feature descriptor 504-A will be understood to correspond to the 3D structure datapoint 502-A having coordinates "(x_A2, y_A2, z_A2)," and so forth. An ellipsis representing various other feature descriptors 504-A corresponding to other 3D structure datapoints 502-A is also shown and it will be understood that feature descriptors 504-A may correspond one-to-one with 3D structure datapoints 502-A (e.g., for the hundreds or thousands of datapoints that may be included in each set) or may correspond in another suitable way. Feature descriptor data (e.g., 32-bit data, 64-bit data, or any other suitable data used in a particular implementation to implement a feature descriptor) for four particular feature descriptors 504-B is also shown using a similar labeling notation as used for feature descriptors 504-A. Feature descriptors 504-C and additional feature descriptors associated with additional master images 402 will also be understood to be associated with similar sets of feature descriptors 504 as shown for master images 402-A and 402-B.

Volumetric feature descriptor generation system 316 may identify or otherwise determine feature descriptors 504 in any manner as may serve a particular implementation. For instance, in certain examples, the determining of respective feature descriptors 504 may be performed using a BRISK algorithm and feature descriptors 504 may be BRISK descriptors. As binary feature descriptors, BRISK descriptors may be computed quickly and may provide high performance and accuracy, as well as being robust in terms of representing features regardless of illumination, scale, rotation, and so forth. In certain examples, other descriptor algorithms, including deep learning-based descriptor algorithms, may be employed together with or as an alternative to BRISK algorithms.

During or after the identification and processing of image features from master images 402, volumetric feature descriptor generation system 316 may consolidate image features using one or more filtering techniques and/or other consolidation techniques. For example, in certain implementations, volumetric feature descriptor generation system 316 may perform such consolidation and filtering for each new set of 3D structure datapoints 502 and feature descriptors 504 as they are generated (e.g., as each master image 402-A is captured and obtained). Thus, for example, 3D structure datapoints and/or feature descriptors associated with certain features of master image 402-B may be removed or filtered out based on a similarity with 3D structure datapoints and/or feature descriptors associated with image features of master image 402-A. Similarly, 3D structure datapoints and/or feature descriptors associated with certain features of master image 402-C may thereafter be removed or filtered out based on a similarity with 3D structure datapoints and/or feature descriptors associated with image features of master images 402-A or 402-B, and so forth. In other implementations, volumetric feature descriptor generation system 316 may perform consolidation and filtering in other ways (e.g., after data has been obtained for all of master images 402).

In any of these ways, a master set of image features may be determined that is configured to represent the volumetric target robustly (e.g., from a suitable variety of perspectives) as well as efficiently (e.g., with minimized wasteful redundancy). For instance, in the example of FIG. 5, this master set of image features is shown to include image features labeled "A2," "B4," "C7," and "D5" in the filtered sets of 3D structure datapoints 414 and feature descriptors 416 included in volumetric feature descriptor dataset 314. It will be understood that these feature points share the same notation used above; for example, the image feature characterized by the 3D structure datapoint 502 at coordinates "(x_A2, y_A2, z_A2)" and the feature descriptor 504 labeled "feature_desc_A2" will be referred to as image feature A2, the image feature characterized by the 3D structure datapoint 502 at coordinates "(x_B4, y_B4, z_B4)" and the feature descriptor 504 labeled "feature_desc_B4" will be referred to as image feature B4, and so forth. Image features A2, B4, C7, D5, and various other image features may all be included in the master set of image features represented in volumetric feature descriptor dataset 314.

Euclidian space filter 506 and feature space filter 508 may each be used in the consolidation process to determine which image features are ultimately included in the master set and which image features are redundant or otherwise not useful to include for other suitable reasons.

Euclidian space filter 506 may analyze 3D structure datapoints 502 for each master image 402 and may determine that certain image features (e.g., a first image feature included in a first set of image features of a first master image such as master image 402-A) are within a threshold distance in Euclidian space from other image features (e.g., a second image feature included in the first set of image features or in a second set of image features of a second master image such as master image 402-B). For example, Euclidian space filter 506 may determine that the 3D structure datapoints 502-A for image features A1 and A2 are very proximate in Euclidian space and thus may be effectively redundant (e.g., only one is needed for the master set). As another example, Euclidian space filter 506 may determine that the 3D structure datapoint 502-A for image feature A2 is very proximate in Euclidian space to the 3D structure datapoint 502-B for image feature B2, thus rendering at least one or these to also be effectively redundant.

Based on these determinations (e.g., that image features A1, A2, and B2 are all within the threshold distance in Euclidian space from one another), volumetric feature descriptor generation system 316 may exclude at least one of these image features from the master set of image features. For example, as shown, the master set of image features represented in volumetric feature descriptor dataset 314 is shown to include a 3D structure datapoint 414 and corresponding feature descriptor 416 for image feature A2, but to exclude such datapoints and descriptors for image features A1 and B2, which will be understood to have been filtered out by Euclidian space filter 506 in this example.

In a similar way, feature space filter 508 may analyze feature descriptors 504 for each master image 402 and may determine that certain image features (e.g., a first image feature included in a first set of image features of a first master image such as master image 402-A) are within a threshold distance in feature space from other image features (e.g., a second image feature included in the first set of image features or in a second set of image features of a second master image such as master image 402-B). For example, feature space filter 508 may determine that the feature descriptors 504-B for image features B3 and B4 are very proximate in feature space. Image features may be determined to be proximate to one another in feature space when their feature descriptors are similar and thus lack an ability to clearly distinguish the features from one another. As such, and analogously with the proximate features in Euclidian space described above, image features too proximate in feature space may be determined to be effectively redundant such that at least one of the points can be excluded from the master set. As another example, feature space filter 508 may determine that the feature descriptor 504-A for image feature A4 is very proximate in feature space to the feature descriptor 504-B for image feature B4, thus rendering at least one of these to also be effectively redundant.

Based on these determinations (e.g., that image features A4, B3, and B4 are all within the threshold distance in feature space from one another), volumetric feature descriptor generation system 316 may exclude at least one of these image features from the master set of image features. For example, as shown, the master set of image features represented in volumetric feature descriptor dataset 314 is shown to include a 3D structure datapoint 414 and corresponding feature descriptor 416 for image feature B4, but to exclude such datapoints and descriptors for image features A4 and B3, which will be understood to have been filtered out by feature space filter 508 in this example.

Figure 6:
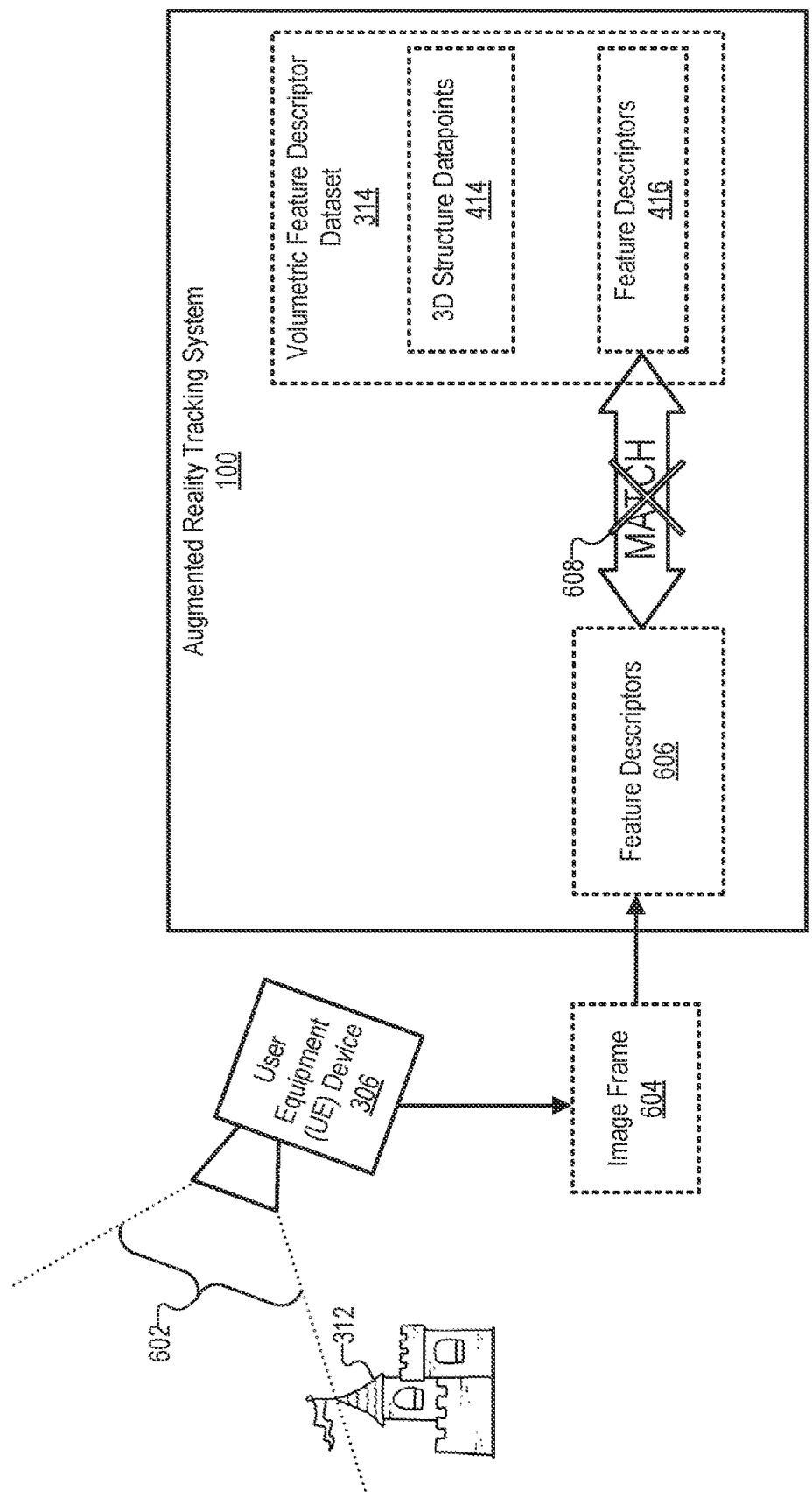
FIGS. 6-7 show illustrative aspects of how an augmented reality tracking system may use a volumetric feature descriptor dataset to perform augmented reality tracking according to embodiments described herein.

FIGS. 6-7 show illustrative aspects of how system 100 may use volumetric feature descriptor dataset 314 to perform augmented reality tracking in accordance with principles described herein. While FIGS. 4-5 illustrated the offline mode (i.e., the volumetric feature descriptor generation mode) in which volumetric feature descriptor dataset 314 is created for use in augmented reality tracking, FIGS. 6-7 illustrate the live mode (i.e., the augmented reality presentation mode) in which volumetric feature descriptor dataset 314 is used to facilitate augmented reality tracking during the presentation of an augmented reality experience.

In the example of FIGS. 6 and 7, UE device 306 is shown to include or be implemented as a capture device having a field of view 602 (in FIG. 6) or field of view 702 (in FIG. 7). For example, UE device 306 may be implemented as an augmented reality presentation device (e.g., a head-worn device, a handheld device, etc.) that includes an integrated camera that a user (e.g., user 308) may direct in different directions within scene 310 as the user explores the augmented reality space during an augmented reality experience. It will be understood that system 100 may be implemented by MEC system 302 operating on provider network 304, as shown in configuration 300, though these elements are not explicitly shown in FIG. 6.

At one moment in time illustrated by FIG. 6, field of view 602 is shown to be directed so as not to capture 3D object 312, which in this example is depicted as the same type of model castle object as model castle object 406, which is the object for which volumetric feature descriptor dataset 314 was generated. More specifically, as shown in FIG. 6, even if a small part of 3D object 312 is within field of view 602, it will be understood that this part of 3D object 312 may not be sufficient for system 100 to identify 3D object 312 as being of the model castle object type represented by volumetric feature descriptor dataset 314. Accordingly, an image frame 604 captured by UE device 306 and provided to system 100 (e.g., one implementation of image frame 318 described above) may depict content within 3D scene 310 other than 3D object 312.

Upon obtaining image frame 604 (as described above in relation to operation 204), system 100 may identify a set of image features depicted in image frame 604 (as described above in relation to operation 206). For example, system 100 may execute the same or a similar feature extraction algorithm as used by volumetric feature descriptor generation system 316 to identify image features from master images 402. Based on volumetric feature descriptor dataset 314 (which, as shown in FIG. 6 and described above in relation to operation 202, system 100 may have already obtained), system 100 may detect whether the volumetric target described by volumetric feature descriptor dataset 314 is depicted in image frame 604 (described above in relation to operation 208). To this end, system 100 may generate a set of feature descriptors 606 for image frame 604 using the BRISK algorithm or another suitable feature descriptor described herein or as may serve a particular implementation.

System 100 may attempt to match feature descriptors 606 for image frame 604 with feature descriptors 416 from volumetric feature descriptor dataset 314 to determine if the content of image frame 604 corresponds to any captured view of volumetric target 406 represented by feature descriptors 416. For example, this matching may be performed in any suitable way (e.g., by flann-based matching, by brute force, etc.) and then verified using a solve perspective-n-point function or another suitable verification technique. In the example of FIG. 6, an 'X' symbol 608 placed across the "MATCH" arrow illustrates that no match is identified while field of view 602 of UE device 306 is directed away from 3D object 312. For example, even if a few feature descriptors may be matched between the sets of feature descriptors 606 and 416, a particular feature descriptor matching threshold (e.g., a threshold number of inliers detected by the perspective-n-point function, a threshold similarity in feature space between feature descriptors determined to match, etc.) may not be satisfied in this example. Accordingly, system 100 may continue to analyze additional image frames provided by UE device 306 after image frame 604 (not explicitly shown) and thereby continue to attempt to identify volumetric target 406 depicted within one of the image frames.

In contrast to FIG. 6, FIG. 7 shows another illustrative moment in time (e.g., a moment before or after the moment illustrated by FIG. 6) when a field of view 702 of UE device 306 is directed toward 3D object 312 such that an image frame 704 captured by UE device 306 and provided to system 100 (e.g., another implementation of image frame 318 described above) does depict 3D object 312. Similar to the scenario described above in relation to FIG. 6, system 100 may obtain image frame 704 and generate a set of feature descriptors 706 to be compared against feature descriptors 416 of volumetric feature descriptor dataset 314. In contrast to FIG. 6, however, in the example of FIG. 7 a check symbol 708 is placed across the "MATCH" arrow to illustrate that a match is identified while field of view 702 of UE device 306 is directed toward 3D object 312.

Based on a match between the set of image features depicted in image frame 704 (as represented by feature descriptors 706) and a set of feature descriptors 416 (e.g., based on a feature descriptor matching threshold being detected to be satisfied), system 100 may detect that the volumetric target represented by volumetric feature descriptor dataset 314 (i.e., 3D object 312 in this example) is depicted in image frame 704. In response to this detection, system 100 may proceed to determine a spatial relationship between UE device 306 and the volumetric target of 3D object 312 (and more specifically, a spatial relationship between the device and the target at the moment when image frame 704 was captured). System 100 may determine this spatial relationship in any suitable way. For example, based on a set of 3D structure datapoints 414 that correspond (within volumetric feature descriptor dataset 314) to the set of feature descriptors 416 detected to match with feature descriptors 706, a spatial relationship analyzer 710 implemented by system 100 may determine the spatial relationship between UE device 306 and 3D object 312. For example, spatial relationship analyzer 710 may be implemented as a perspective-n-point solver configured to identify when a threshold number of inliers is present, such that spatial relationship analyzer 710 may determine and/or verify a match to thereby determine the spatial relationship between UE device 306 and the volumetric target. The spatial relationship may be defined, for example, as a pose (e.g., a position and orientation) of UE device 306 with respect to 3D object 312, a pose of 3D object 312 with respect to UE device 306, a pose of both UE device 306 and 3D object 312 with respect to a particular coordinate system, or in another manner as may serve a particular implementation.

Once image features (e.g., key points and pixels) resulting in a verified match have been identified and a spatial relationship has been defined, system 100 may use these image features to track the spatial relationship (e.g., track the movement of UE device 306 with respect to 3D object 312) based on optical flow and/or other suitable computer vision tracking techniques. For example, based on the determining of the spatial relationship between UE device 306 and 3D object 312, system 100 may track the spatial relationship for a plurality of image frames (not explicitly shown) that are obtained subsequent to image frame 704. As shown, system 100 (and, in particular, spatial relationship analyzer 710 within system 100) may also provide, to UE device 306, tracking data 320 representative of the tracked spatial relationship. For example, tracking data 320 may be configured for use by UE device 306 in presenting an augmented reality experience to a user (e.g., user 308, who is not explicitly shown in FIG. 7), and may be generated, updated, and provided in real-time as UE device 306 presents the augmented reality experience. When based on this accurate real-time tracking data 320, the augmented reality experience presented to the user may include one or more augmentations that account for the volumetric target of 3D object 312 in a manner that provides any or all the accuracy and efficiency advantages that have been described herein.

The extended example described in relation to FIGS. 4-7 and relating to the 3D model castle object (i.e., relating to volumetric target 406, which formed the basis of volumetric feature descriptor dataset 314, and to 3D object 312, which was an instance of volumetric target 406 present in the real-world environment of 3D scene 310 with user 308) illustrates one way that system 100 may operate in a configuration such as configuration 300 of FIG. 3. However, as mentioned above, this configuration is illustrative only and it will be understood that system 100 may operate with other types of volumetric targets and in other types of configurations as well.

For example, rather than the volumetric target being a 3D object such as 3D object 312, system 100 may operate, in certain examples, with a volumetric target that is a 3D scene. In such examples, the plurality of views of the volumetric target may be views of the 3D scene from vantage points within the 3D scene (rather than 360° around the object as described above for 3D object 312), and a plurality of master images may be captured by a capture device associated with the UE device as a pose of the capture device is dynamically changed to correspond to the views of the 3D scene from the vantage points within the 3D scene. For instance, rather than a stationary capture device capturing master images of a single 3D object rotating on a turntable (e.g., rather than capture device 404 capturing master images 402 of 3D object 406 rotating on turntable 410 as shown in FIG. 4), these types of examples may involve master images of a 3D scene (e.g., a particular room) being captured, by a capture device such as the UE device that is presenting the augmented reality system, from various positions and perspectives in the 3D scene.

To illustrate, FIG. 8 shows another illustrative configuration 800 in which system 100 may operate in accordance with principles described herein. Configuration 800 is similar to configuration 300 in certain respects. For example, as shown in the example of configuration 800, system 100 is again implemented by a MEC system 802 (similar to MEC system 302) operating on a provider network 804 (similar to provider network 304) and a UE device 806 (similar to UE device 306) is shown to be communicatively coupled to MEC system 802 by way of provider network 804. Further similarities shown in FIG. 8 include that UE device 806 is used by a user 808 (similar to user 308) as UE device 806 and user 808 are located within a 3D scene 810 (similar to 3D scene 310) together with various 3D objects including an illustrative 3D object 812 (similar to 3D object 312).

Along with the similarities between configurations 300 and 800, however, there are also distinctions. For example, while volumetric feature descriptor generation system 316 was shown to be separate from system 100 in configuration 300, a volumetric feature descriptor generation system 816 (analogous to volumetric feature descriptor generation system 316) is shown to be implemented by, included within, and/or otherwise integrated with system 100 such that a volumetric feature descriptor dataset 814 (analogous to volumetric feature descriptor dataset 314) is obtained by system 100 by being generated by system 100 (i.e., by volumetric feature descriptor generation system 816 within system 100). As another distinction between configurations 300 and 800, the volumetric target may be 3D scene 810 itself (which includes 3D object 812 and may include various other 3D objects not explicitly shown), rather than the individual 3D object 812 as described above. As such, volumetric feature descriptor dataset 814 will be understood to be representative of 3D scene 810 in this example, such that each 3D structure datapoint and feature descriptor included within the volumetric feature descriptor dataset is associated with a detected image feature of a particular aspect of 3D scene 810 (e.g., a particular wall, ceiling, floor, object within the room, etc.).

In many respects system 100 may operate in configuration 800 as has been described for the extended example corresponding to configuration 300. For example, the operations of method 200 may each be performed in configuration 800 to 1) obtain (e.g., generate) a volumetric feature descriptor dataset (e.g., volumetric feature descriptor dataset 814); 2) obtain image frames captured by a UE device (e.g., obtain image frames 818 captured by UE device 806, similar to image frames 318 captured by UE device 306); 3) identify a set of image features depicted in these image frames; 4) detect that the volumetric target (e.g., 3D scene 810) is depicted in at least some of the image frames; and 5) determine the spatial relationship between the UE device and the volumetric target (e.g., determine the pose of UE device 806 within 3D scene 810). Additionally, based on the spatial relationship determined by system 100, tracking data 820 (similar to tracking data 320) may be provided back to UE device 806 to facilitate augmented reality tracking to allow an optimal augmented reality experience to be provided to user 808.

As a result of the distinct nature of a volumetric target like 3D scene 810 as compared to a volumetric target like 3D object 312, it will also be understood that system 100 may perform certain tasks in different ways than have been described above. For example, while system 100 may determine 3D structure datapoints using a structure-from-motion technique as a turntable rotates a 3D object 360° to present various views of the 3D object to a stationary capture device (as described and illustrated above), alternatives to stationary capture devices and turntables may be employed for capturing a volumetric target such as an entirety of 3D scene 810. In certain implementations, for instance, a combination of color data and depth data (referred to as "RGB-D" data) may be captured by a capture device moving within 3D scene 810 (e.g., UE device 806 itself) and system 100 may employ this RGB-D data in connection with scene mapping techniques such as a visual odometry technique to determine 3D structure datapoints for 3D scene 810 that would be analogous to 3D structure datapoints 414 described above.

Another distinction that may be implemented for a configuration such as configuration 800 is that the master images provided in the offline mode for use as a basis for generating volumetric feature descriptor dataset 814 may depict the same volumetric target that is to be identified rather than a similar or identical, but separate, instance of the object. For example, master images provided during an offline mode by UE device 806 (not explicitly illustrated in FIG. 8) may depict the very scene 810 in which the augmented reality experience is to occur, which, as described above, may not be the case for a scenario in which a prototype instance of a 3D object (e.g., the model castle object) is analyzed by a producer of the object to generate a volumetric feature descriptor dataset that can be used to identify similar or identical instances of the object that may actually be sold and present within a 3D scene during an augmented reality experience. As a result of this distinction, the source of the master images may be UE device 806 rather than a distinct capture device such as capture device 404, and there may not need to be the same sharp distinction between the offline mode and the live mode described above. For instance, certain image frames captured when system 100 operates in the live mode may also serve as master images to enhance and/or update volumetric feature descriptor dataset 814 during the augmented reality experience.

As part of analyzing 3D scene 810 to generate volumetric feature descriptor dataset 814, system 100 may analyze various objects within 3D scene 810, including, for example 3D object 812. This analysis may be based on whatever master images can be captured of the objects in 3D scene 810 as UE device 806 is moved to capture different views within the scene. As such, it will be understood that these master images may not necessarily be captured as deliberately and thoroughly as described above for 3D object 312 (which was meticulously analyzed from carefully controlled angles using a tripod, turntable, and so forth). However, given that 3D scene 810 includes 3D object 812, the views of 3D scene 810 from the vantage points within 3D scene 810 that are represented in the master images provided by UE device 806 may include views of 3D scene 810 from vantage points distributed around 3D object 812 such that 3D object 812 can be at least partially represented by 3D structure datapoints and feature descriptors within volumetric feature descriptor dataset 814. In this way, the presence of 3D object 812 within 3D scene 810 may be accounted for in tracking data 820 along with various other aspects of 3D scene 810 such as geometrical information about the walls, ceiling, floor, and/or other objects in the room.

One advantage of mapping out objects and other aspects of a 3D scene like 3D scene 810 is that an augmented reality experience provided by UE device 806 to user 808 may accurately and immersively account for these objects and other aspects as various augmentations and virtual elements are displayed. For example, if an augmentation of a virtual character is to be displayed as if present in 3D scene 810 with user 808, tracking data 820 generated based on volumetric feature descriptor dataset 814 may allow for the augmentation to stand in a part of the room that is not occupied by another object and even to be occluded by 3D object 812 and/or other real objects present, rather than "floating" in front of the real-world objects without regard for the objects as is typical in conventional augmented reality presentations. The character could walk around the room, for example, and avoid obstacles in a similar manner as a real person would. Similarly, the character could appear to be contained by the walls and other solid objects rather than just passing through them, allowing the character, for instance, to sit on a real-world chair or stand up and dance on a real-world table. The realism of such a character (or other suitable augmentation) would also be enhanced by the augmentation being properly occluded by objects that are nearer to the viewer's vantage point than the augmentation is being presented. For example, if 3D object 312 is a real-world table, a character augmentation presented as part of an augmented reality experience may be presented to be standing behind the table and the character's legs may be occluded by the table just as would a real person if standing at the same spot.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
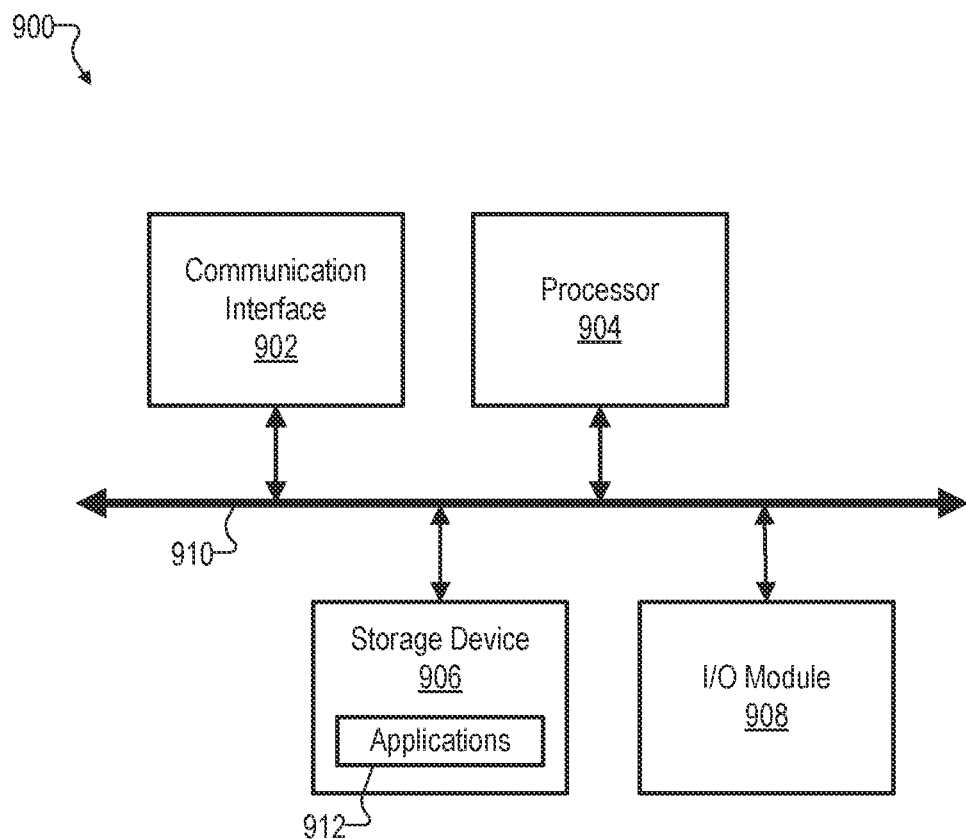
FIG. 9 shows an illustrative computing device that may implement augmented reality tracking systems and/or other systems and devices described herein in accordance with principles described herein.

FIG. 9 shows an illustrative computing device 900 that may implement augmented reality tracking systems and/or other systems and devices described herein in accordance with principles described herein. For example, computing device 900 may include or implement (or partially implement) an augmented reality tracking system such as system 100 or any component included therein or any system associated therewith (e.g., MEC systems 302 or 802, elements of provider networks 304 and/or 804, volumetric feature descriptor generation systems 316 and/or 816, UE devices 306 and/or 806, etc.).

As shown in FIG. 9, computing device 900 may include a communication interface 902, a processor 904, a storage device 906, and an input/output (I/O) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
   obtaining, by an augmented reality tracking system, a volumetric feature descriptor dataset that is based on a plurality of master images depicting a plurality of views of a volumetric target, wherein:
   the volumetric target is a three-dimensional (3D) object and the plurality of views of the volumetric target are views of the 3D object from vantage points distributed around the 3D object, and
   the volumetric feature descriptor dataset includes:
     a plurality of feature descriptors associated with a plurality of image features of the volumetric target, and
     a plurality of three-dimensional (3D) structure datapoints including a corresponding 3D structure datapoint for each of the plurality of feature descriptors;
   obtaining, by the augmented reality tracking system, an image frame captured by a user equipment (UE) device;
   identifying, by the augmented reality tracking system, a set of image features depicted in the image frame;
   detecting, by the augmented reality tracking system based on a match between the set of image features depicted in the image frame and a set of feature descriptors of the plurality of feature descriptors, that the volumetric target is depicted in the image frame; and
   determining, by the augmented reality tracking system in response to the detecting and based on a set of 3D structure datapoints that correspond within the volumetric feature descriptor dataset to the set of feature descriptors detected in the match, a spatial relationship between the UE device and the volumetric target.

2. The method of claim 1, further comprising:
   obtaining, by the augmented reality tracking system, the plurality of master images;
   identifying, by the augmented reality tracking system, a respective set of image features for each of the plurality of master images; and
   consolidating, by the augmented reality tracking system, the respective sets of image features for each of the plurality of master images into a master set of image features for the volumetric target;
   wherein the obtaining of the volumetric feature descriptor dataset includes generating the volumetric feature descriptor dataset by:
     determining, as the plurality of feature descriptors, respective feature descriptors for each of the master set of image features for the volumetric target;
     determining, as the plurality of 3D structure datapoints, respective 3D structure datapoints for each of the master set of image features for the volumetric target; and
     storing the plurality of feature descriptors and the plurality of 3D structure datapoints in a data structure implementing the volumetric feature descriptor dataset.

3. The method of claim 1, wherein the plurality of master images are captured by a stationary capture device having a view of a turntable on which the 3D object rests as the turntable rotates the 3D object 360° to present, to the stationary capture device, the views of the 3D object from the vantage points distributed around the 3D object.

4. The method of claim 2, wherein the determining of the respective 3D structure datapoints is performed using a structure-from-motion technique as a turntable rotates the 3D object 360° to present the views of the 3D object from the vantage points distributed around the 3D object.

5. The method of claim 1, wherein:
   the obtaining of the volumetric feature descriptor dataset includes generating the volumetric feature descriptor dataset by performing operations including consolidating a respective set of image features for each of the plurality of master images; and
   the consolidating of the respective sets of image features includes:

determining that a first image feature included in a first set of image features of a first master image is within a threshold distance in Euclidian space from a second image feature included in a second set of image features of a second master image; and based on the determining that the first image feature is within the threshold distance in Euclidian space from the second image feature, excluding at least one of the first or second image features from the master set of image features.

6. The method of claim 1, wherein:

the obtaining of the volumetric feature descriptor dataset includes generating the volumetric feature descriptor dataset by performing operations including consolidating a respective set of image features for each of the plurality of master images; and the consolidating of the respective sets of image features includes:

determining that a first image feature included in a first set of image features of a first master image is within a threshold distance in feature space from a second image feature included in a second set of image features of a second master image; and based on the determining that the first image feature is within the threshold distance in feature space from the second image feature, excluding at least one of the first or second image features from the master set of image features.

7. The method of claim 1, further comprising:

tracking, by the augmented reality tracking system based on the determining of the spatial relationship between the UE device and the volumetric target, the spatial relationship for a plurality of image frames obtained subsequent to the image frame; and providing, by the augmented reality tracking system to the UE device, tracking data representative of the tracked spatial relationship, the tracking data configured for use by the UE device in presenting, to a user, an augmented reality experience that includes an augmentation presented in a manner that accounts for the volumetric target.

8. The method of claim 1, wherein:

the augmented reality tracking system is implemented by a multi-access edge compute (MEC) system operating on a provider network;

the UE device is communicatively coupled to the MEC system by way of the provider network; and the obtaining of the image frame captured by the UE device is performed by way of the provider network.

9. A system comprising:

a memory storing instructions; and a processor communicatively coupled to the memory and configured to execute the instructions to:

obtain a volumetric feature descriptor dataset that is based on a plurality of master images depicting a plurality of views of a volumetric target, wherein:

the volumetric target is a three-dimensional (3D) object and the plurality of views of the volumetric target are views of the 3D object from vantage points distributed around the 3D object, and the volumetric feature descriptor dataset includes:

a plurality of feature descriptors associated with a plurality of image features of the volumetric target, and a plurality of three-dimensional (3D) structure datapoints including a corresponding 3D structure datapoint for each of the plurality of feature descriptors;

obtain an image frame captured by a user equipment (UE) device;

identify a set of image features depicted in the image frame;

detect, based on a match between the set of image features depicted in the image frame and a set of feature descriptors of the plurality of feature descriptors, that the volumetric target is depicted in the image frame; and determine, in response to the detecting and based on a set of 3D structure datapoints that correspond within the volumetric feature descriptor dataset to the set of feature descriptors detected in the match, a spatial relationship between the UE device and the volumetric target.

10. The system of claim 9, wherein:

the processor is further configured to execute the instructions to:

obtain the plurality of master images;

identify a respective set of image features for each of the plurality of master images; and consolidate the respective sets of image features for each of the plurality of master images into a master set of image features for the volumetric target; and the obtaining of the volumetric feature descriptor dataset includes generating the volumetric feature descriptor dataset by:

determining, as the plurality of feature descriptors, respective feature descriptors for each of the master set of image features for the volumetric target;

determining, as the plurality of 3D structure datapoints, respective 3D structure datapoints for each of the master set of image features for the volumetric target; and storing the plurality of feature descriptors and the plurality of 3D structure datapoints in a data structure implementing the volumetric feature descriptor dataset.

11. The system of claim 9, wherein the plurality of master images are captured by a stationary capture device having a view of a turntable on which the 3D object rests as the turntable rotates the 3D object 360° to present, to the stationary capture device, the views of the 3D object from the vantage points distributed around the 3D object.

12. The system of claim 9, wherein:

the obtaining of the volumetric feature descriptor dataset includes generating the volumetric feature descriptor dataset by performing operations including consolidating a respective set of image features for each of the plurality of master images; and the consolidating of the respective sets of image features includes:

determining that a first image feature included in a first set of image features of a first master image is within a threshold distance in Euclidian space from a second image feature included in a second set of image features of a second master image; and based on the determining that the first image feature is within the threshold distance in Euclidian space from the second image feature, excluding at least one of the first or second image features from the master set of image features.

13. The system of claim 9, wherein:
the obtaining of the volumetric feature descriptor dataset includes generating the volumetric feature descriptor dataset by performing operations including consolidating a respective set of image features for each of the plurality of master images; and
the consolidating of the respective sets of image features includes:
  determining that a first image feature included in a first set of image features of a first master image is within a threshold distance in feature space from a second image feature included in a second set of image features of a second master image; and
  based on the determining that the first image feature is within the threshold distance in feature space from the second image feature, excluding at least one of the first or second image features from the master set of image features.

14. The system of claim 9, wherein the processor is further configured to execute the instructions to:
track, based on the determining of the spatial relationship between the UE device and the volumetric target, the spatial relationship for a plurality of image frames obtained subsequent to the image frame; and
provide, to the UE device, tracking data representative of the tracked spatial relationship, the tracking data configured for use by the UE device in presenting, to a user, an augmented reality experience that includes an augmentation presented in a manner that accounts for the volumetric target.

15. A non-transitory computer-readable medium storing instructions that, when executed, direct a processor of a computing device to:
obtain a volumetric feature descriptor dataset that is based on a plurality of master images depicting a plurality of views of a volumetric target, wherein:
  the volumetric target is a three-dimensional (3D) object and the plurality of views of the volumetric target are views of the 3D object from vantage points distributed around the 3D object, and
  the volumetric feature descriptor dataset includes:
    a plurality of feature descriptors associated with a plurality of image features of the volumetric target, and
    a plurality of three-dimensional (3D) structure datapoints including a corresponding 3D structure datapoint for each of the plurality of feature descriptors;
obtain an image frame captured by a user equipment (UE) device;
identify a set of image features depicted in the image frame;
detect, based on a match between the set of image features depicted in the image frame and a set of feature descriptors of the plurality of feature descriptors, that the volumetric target is depicted in the image frame; and
determine, in response to the detecting and based on a set of 3D structure datapoints that correspond within the volumetric feature descriptor dataset to the set of feature descriptors detected in the match, a spatial relationship between the UE device and the volumetric target.

16. The system of claim 10, wherein the determining of the respective 3D structure datapoints is performed using a structure-from-motion technique as a turntable rotates the 3D object 360° to present the views of the 3D object from the vantage points distributed around the 3D object.

17. The system of claim 9, implemented by a multi-access edge compute (MEC) system operating on a provider network, wherein:
the UE device is communicatively coupled to the MEC system by way of the provider network; and
the obtaining of the image frame captured by the UE device is performed by way of the provider network.

18. The non-transitory computer-readable medium of claim 15, wherein:
the instructions further direct the processor to:
  obtain the plurality of master images;
  identify a respective set of image features for each of the plurality of master images; and
  consolidate the respective sets of image features for each of the plurality of master images into a master set of image features for the volumetric target; and
the obtaining of the volumetric feature descriptor dataset includes generating the volumetric feature descriptor dataset by:
  determining, as the plurality of feature descriptors, respective feature descriptors for each of the master set of image features for the volumetric target;
  determining, as the plurality of 3D structure datapoints, respective 3D structure datapoints for each of the master set of image features for the volumetric target; and
  storing the plurality of feature descriptors and the plurality of 3D structure datapoints in a data structure implementing the volumetric feature descriptor dataset.

19. The computer-readable medium of claim 15, wherein the plurality of master images are captured by a stationary capture device having a view of a turntable on which the 3D object rests as the turntable rotates the 3D object 360° to present, to the stationary capture device, the views of the 3D object from the vantage points distributed around the 3D object.

20. The computer-readable medium of claim 18, wherein the determining of the respective 3D structure datapoints is performed using a structure-from-motion technique as a turntable rotates the 3D object 360° to present the views of the 3D object from the vantage points distributed around the 3D object.

* * * * *